Jan. 25, 1966   J. M. LEAHY   3,231,147

LUBRICATION PUMP

Filed Oct. 2, 1963

INVENTOR
John M. Leahy

By *William J. Newman*
Attorney

United States Patent Office 3,231,147
Patented Jan. 25, 1966

3,231,147
LUBRICATION PUMP
John Michael Leahy, Chicago, Ill., assignor to Stewart-Warner Corporation, Chicago, Ill., a corporation of Virginia
Filed Oct. 2, 1963, Ser. No. 313,233
1 Claim. (Cl. 222—262)

This invention relates to lubrication apparatus and more particularly to lubricating pumps of the type generally represented as hand lever lubrication guns.

One of the primary objects of the invention is to provide a simple and inexpensive lubricant pump particularly adapted for viscous lubricants such as grease. The gun of this invention is adapted to be used with a cartridge supply of grease in which both ends are removable and the open cartridge is insertable into the gun for application under pumping pressure to the desired fitting. The use of a cartridge considerably facilitates the operations involved in servicing and using the pump. For example, it simplifies filling the reservoir with lubricant, cleaning same after use. Savings are also experienced in the cost of manufacture of the grease guns.

Previous hand gun lubricating pumps using cartridge-type grease supplies required the use of positive means for putting pressure on the grease in the cartridge so that it could be adequately fed to the pump portion of the gun. In some guns coiled springs of substantial compressive force were used in cooperation with a follower member to push the grease out of the cartridge. In other guns hand screw plunger means were used for applying the required pressures to extract the grease from the cartridge.

It is an object of this invention to provide a cartridge-type hand gun which is adapted to operate without the use of positive pressure applying means such as a spring or hand screwed plunger. Thus, the gun is more easily prepared with a lubricant supply and the cost of manufacture of the gun is materially reduced.

It is also an object of this invention to provide a lubricant gun using a cartridge-type grease supply and comprising a barrel snugly receiving the cartridge with a removable cap at one end of the barrel. A pumping head is at the other end of the barrel having a pumping chamber. Means are provided in the head for communication from the adjacent open end of the cartridge in the barrel and the pumping chamber. Sealing means, such as a gasket are provided, between the head and the periphery of the cartridge to prevent air or grease leakage about the exterior of the cartridge. A follower insertable into the other open end of said cartridge sealingly engages the interior surface of the cartridge so that suction created in the pumping chamber causes grease to flow into the chamber and the follower to advance through the cartridge. Flexible means, such as a bead chain, or the like, may be provided between the follower and the removable end cap so that the follower can be extricated from the interior of the cartridge.

Other objects, advantages and features of this invention will become apparent upon a further reading of the specification especially when taken in view of the accompanying drawings, in which.

Figure 1:
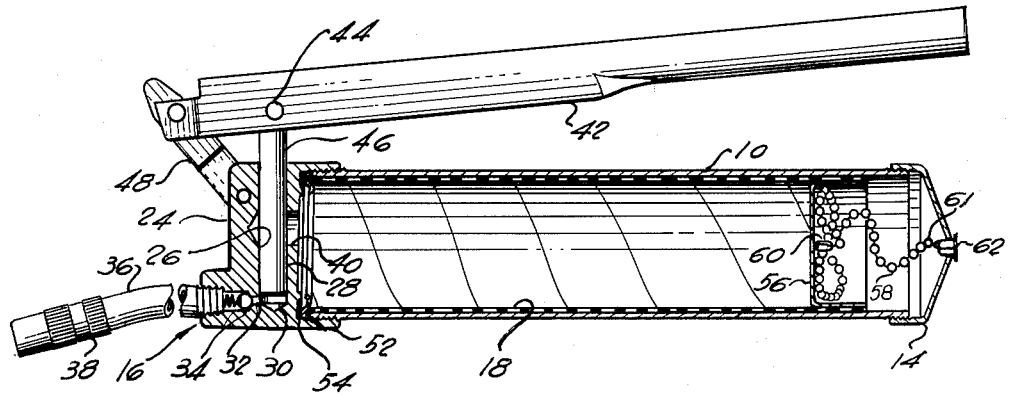
FIG. 1 is a section view of a grease lubrication hand pump embodying the teachings of this invention.
Figure 2:
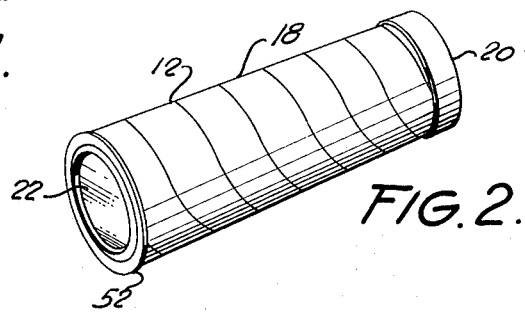
FIG. 2 is an isometric view of a grease cartridge for use in the hand pump of FIG. 1.
Figure 3:
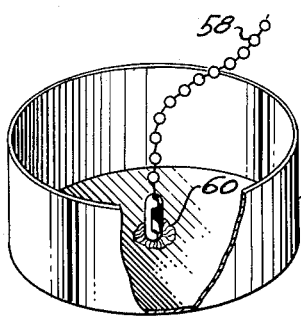
FIG. 3 is a perspective view of a follower unit for use with the hand pump of FIG. 1.
Figure 4:
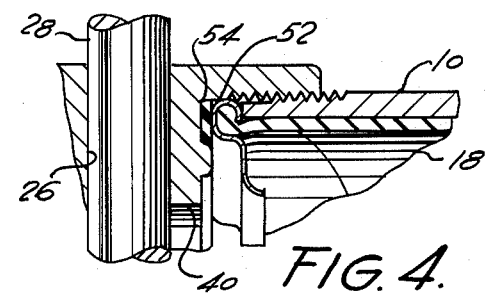
FIG. 4 is an elevation view of the hand gun.
Figure 5:
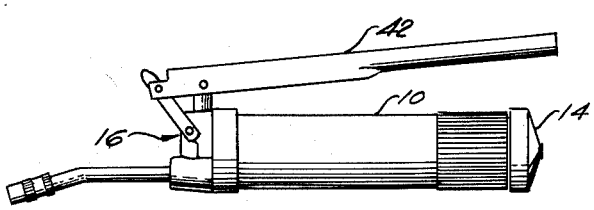
FIG. 5 is an overall view of the grease lubrication hand pump.

A preferred form of lubricant pump comprises a barrel 10 for containing a cartridge 12 of grease, and has a removable cap 14 at one end with a pump assembly head 16 attached to the other end. The cartridge 12 is the standard type commercially available from many lubricant firms and includes a cardboard body 18 with a removable cup-shaped cap 20 at one end and a removable lid cap 22 at the other end for insertion into the barrel as hereinafter described.

The pumping head assembly 16 comprises a head casting 24 having a transverse cylinder bore 26 in which a plunger or piston 28 is reciprocatable. The piston 28 and the cylinder bore 26 form a pumping chamber 30 which communicates at its lower end with an outlet passageway 32 which is normally closed by a spring loaded ball check 34. A discharge tube 36 is suitably connected to the discharge passageway 32 and carries at its extremity a coupler 38 for making connection with a lubricant receiving fitting (not shown). A handle 42 is pivotally connected at 44 to the end 46 of the plunger 28 extending from the head casting 24, and it is pivotally connected to the casting by a pair of links 48. A passage 40 provides communication for grease from the cartridge in the barrel to the pumping chamber 30 when the handle is in its raised position.

The barrel 10 is threadedly received within a recess 50 formed in the pumping head casting 24. It will be noted that the barrel 10 is sized to snugly receive the cartridge 18 and the bead 52 about the removable lid-type cap 22 is held in snug and sealing engagement with an annular, fiber composition gasket 54 in the bottom of recess 50. The thrust force provided by the threaded connection between the barrel 10 and the head casting 24 holds the seal to prevent air or lubricant seepage therepast and intercommunication between grease inlet 40 and the space between the barrel 10 and the cartridge 18 is prevented.

A follower member 56 is insertable into the other open end of cartridge 12 which had been covered by the cap 20. The follower comprises a nonflexible, cup-shaped member which is sized to engage the interior of the cardboard body of cartridge 12. A bead chain 58 has one end 60 fastened to the follower 56 and the other end 62 fastened to the removable cap 14. Thus, the follower 56 may be extracted from the cartridge 12 conveniently by unscrewing the cap 14 and pulling the follower while the remainder of the cartridge is securely held at bead 52 between the head casting 24 and the barrel 10. The chain end 62 has a loose coupling with the cap 14 to provide atmospheric pressure to the follower end of the cartridge. To introduce a grease cartridge into the hand lever gun for operation, the barrel is unscrewed from the pumping head casting 24 and the cap 20 is removed from the one end of the cartridge 12. As mentioned, the interior of barrel 10 is just large enough to snugly receive the body portion 18 of the cartridge and it is forced into the barrel until the end of the barrel engages the bead 52. The lid 22 is then removed and the barrel, along with its contained cartridge, is threaded into the head casting 24 until the cartridge bead 52 is in sealing engagement with the gasket 54.

The follower 56 is inserted into the end of the cardboard tubular body of the cartridge 12 through the opened end of the barrel 10. It is then forced in until it suitably engages the grease within the cartridge and the cap 14 is threaded onto the end of the barrel.

When a lubricant pump is operated a partial vacuum is formed in the pumping chamber 30 during the initial portion of the upstroke of the piston 28. This vacuum is extended to the interior of the cartridge through the opened lid end 22 when the piston uncovers the inlet port 40. The pressure differential between the inlet port 40 and the other end of the barrel which is open to atmospheric pressure causes the follower member 56 to advance within the cartridge body 18 towards the pumping head assembly 16. Grease is, therefore, forced through the inlet port 40 into the pumping chamber 30. It is forced out the outlet conduit 32 on the downward stroke of the piston through the ball check 34. The pump may be worked repeatedly until the follower 56 has traversed the length of the cartridge 12 to force out all the grease. The cap 14 is unscrewed and the follower 56 extracted from the cartridge by pulling it with the aid of the cap 14 and chain 58. The barrel 10 is unscrewed from head casting 24 to remove the cartridge and a new cartridge is inserted as previously described.

The above described construction eliminates the need for the costly spring or hand operated plunger for pushing the grease through the cartridge. It has been found that the sealing arrangement herein disclosed adequately prevents the grease from seeping into the interstice between the cartridge 12 and the barrel 10 so that cleaning problems are lessened. Also, the filling procedure is simplified by the elimination of a spring loaded or hand screw plunger.

While there has been described a preferred embodiment of a lubricating hand lever gun embodying the teachings of this invention, it is recognized that many modifications may be made thereto without departing from the spirit of the invention. It is, therefore, intended that this invention be limited only by the scope of the appended claim.

What is claimed is:

A lubricant gun of the type which receives in its barrel a disposable lubricant cartridge having removable end closures said gun comprising

- a barrel having a forward end and a rearward end,
- a pumping head detachably secured to the forward end of the barrel and having a pumping chamber,
- lubricant inlet and outlet ports in said head communicating with said chamber,
- a pumping lever operatively connected to said pumping head for reciprocating a plunger in said chamber to create a vacuum for drawing lubricant forwardly,
- means on said head for accomplishing sealing engagement with the adjacent open end of an inserted lubricant cartridge,
- a follower transversely inserted within the cartridge for accomplishing a snug and slidable engagement with the interior wall of the cartridge,
- a removable closure on the rearward end of the barrel and formed with an air-admitting opening so atmospheric pressure may be exerted against the follower,
- a bead chain connector for retracting the follower having an inner end attached to the follower and an outer end which together with the bead chain accomplishes a loose coupling by way of the air-admitting opening with said removable closure.

References Cited by the Examiner
UNITED STATES PATENTS

| | | | |
|---|---|---|---|
| 1,659,950 | 2/1928 | Goodman | 222—326 X |
| 2,175,522 | 10/1939 | Ginter | 222—326 X |
| 2,844,287 | 7/1958 | Brandt et al. | 222—326 |
| 2,886,215 | 5/1959 | Klein et al. | 222—326 X |
| 2,899,112 | 8/1959 | Morton | 222—325 |

LOUIS J. DEMBO, *Primary Examiner.*

RAPHAEL M. LUPO, *Examiner.*